UNITED STATES PATENT OFFICE.

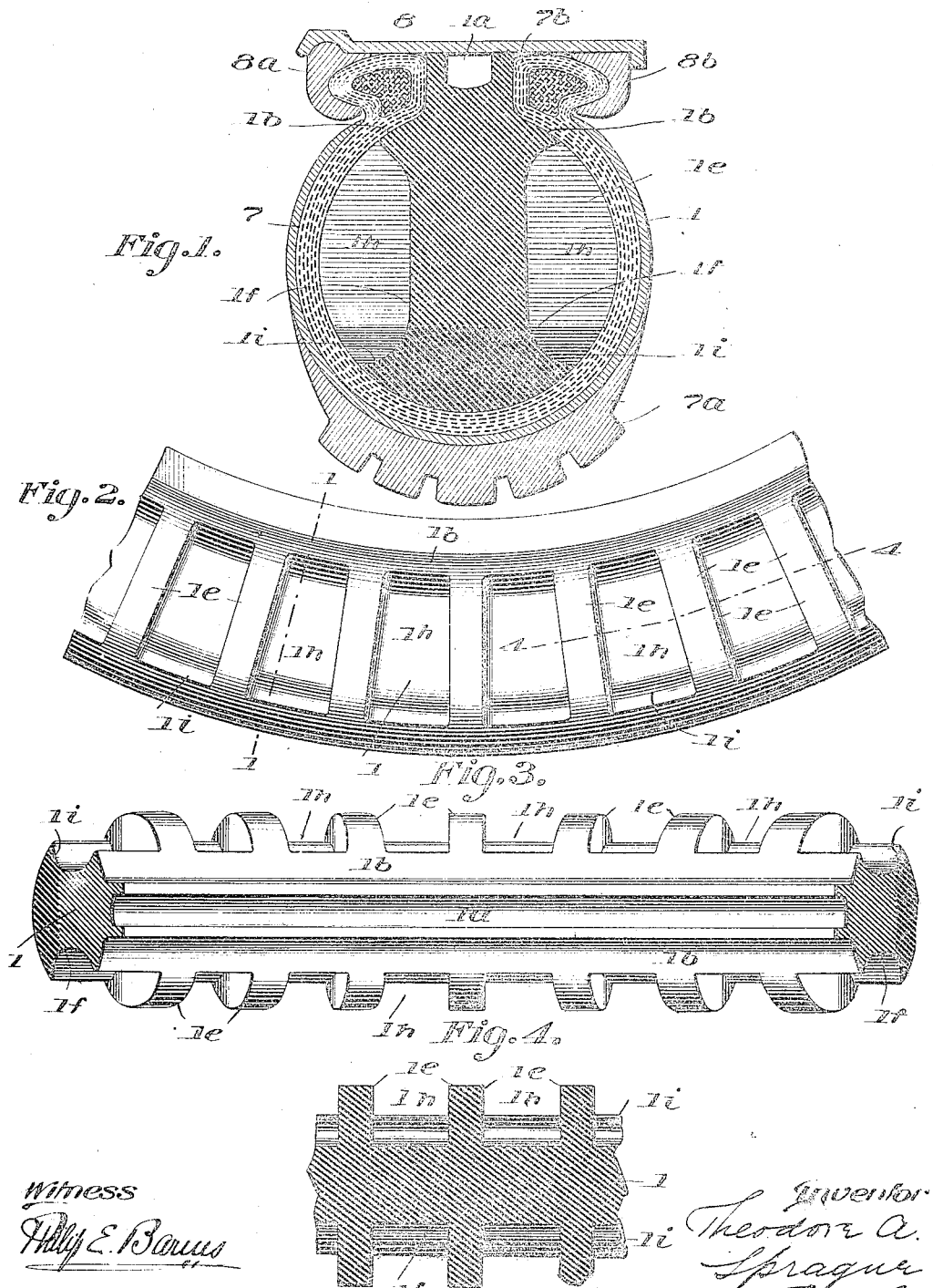

THEODORE A. SPRAGUE, OF PITTSBURGH, PENNSYLVANIA.

FILLER FOR TIRE-CASINGS.

1,225,880.　　　　　　　Specification of Letters Patent.　　Patented May 15, 1917.

Application filed April 26, 1916.　Serial No. 93,709.

*To all whom it may concern:*

Be it known that I, THEODORE A. SPRAGUE, a citizen of the United States, residing at Pittsburgh, in the county of Allegheny and State of Pennsylvania, have invented certain new and useful Improvements in a Filler for Tire-Casings; and I hereby declare that the following is a full, clear, and exact description thereof, reference being had to the accompanying drawings, which form part of this specification.

This invention is a novel improvement in vehicle tires of the type in which instead of employing a pneumatic tube as a filler for the tire casing a resilient body or core is used. The object of the present invention is to provide a filler or core for such tires which will insure more equal and uniform distribution of the weight and pressure upon the outer casing, thereby increasing the durability of the outer casing; and also preventing the tire jarring or jumping as the wheel rotates because of any unequal pressures or bearing of the filler upon the tire casing; and a tire provided with my novel filler or core will possess many of the advantages of a pneumatic tire together with the advantages of durability and nonpuncturability of solid cushion tires.

I will explain the invention as illustrated in the accompanying drawings in which:

Figure 1 is a transverse section through a complete tire showing the core in section on the line 1—1 Fig. 2.

Fig. 2 is a side view of part of the core detached.

Fig. 3 is a plan view of Fig. 2.

Fig. 4 is a detail section on line 4—4, Fig. 2.

My novel core or filler is preferably made annular and of such size that it will fit around the rim or periphery of the wheel to which it is to be applied; and of a major circumference or cross section sufficient to fill the interior of the outer casing with which the filler or core is employed when such casing is applied to the wheel.

In general the core has a longitudinal central rib or bearing portion 1 which extends radially of and perpendicular to the axis of the wheel, and forms a direct support between the rim or felly 8 of the wheel to which the tire is applied and the tread portion $7^a$ of the tire casing.

The inner edge of this central bearing portion 1 of the core is adapted to contact with the rim 8 as shown in Fig. 1 and is preferably provided with an annular groove $1^a$ opposed to the rim 8 which groove enhances the resiliency of the core when under load.

The portion 1 is also shouldered as at $1^b$ on its opposite sides and near its inner edge to accommodate and engage the clencher portions $7^b$ of the tire casing. The said clencher portions $7^b$ of the casing, in the example shown, may be secured to the rim by means of the usual clamp members $8^a$ and $8^b$, or in other suitable manner. The shoulders $1^b$ near the inner edge of the portion 1, engage the inner ends of the said clencher portions $7^b$ as shown in Fig. 1 so that the core has a direct firm bearing upon and against the clencher portions $7^b$ and will tightly hold and lock same in position when the tire is applied to the wheel rim.

The outer part of the body portion of the core is widened as at $1^i$ so as to increase the bearing contact between the outer surface of the core and the inner surface of the casing at the point where the load is greatest upon the core and casing; and this outer portion $1^i$ is preferably made of softer and more elastic material than the main body of the core, which enhances the cushioned effect of the filler.

The sides of the bearing portion 1 may be concaved as at $1^f$ and on each side of the body portion are spaced projections or partitions $1^e$ which extend radially from the part $1^i$ to the shouldered parts $1^b$; and said partitions $1^e$ together with the intermediate portion 1 form at spaced intervals solid transverse supporting portions of the core or filler equal in circumference to and completely filling the cross section of the interior of the casing 7. These partitions $1^e$ serve to brace the casing and support same both vertically and laterally; and also materially enhance the load sustaining qualities of the portion 1 of the core.

The spaces $1^h$ between the projections $1^e$ form air spaces and will permit proper expansion or contraction of the partitions and portion 1 of the core or filler. These partitions $1^e$ also take care of lateral motions and strains on the tire and casing and assist in supporting the load upon the tire.

When such a core is properly placed within the casing and attached to a wheel the core cannot creep on the rim or in the tire casing, and thus prevents and avoids rim cuts; and because of the shoulders 1ᵇ the greater the load on the tire the more tightly are the clencher members 7ᵇ of the casing held against the clamp members 8ᵃ, 8ᵇ; and so that neither the core nor the casing can creep or rotate on the rim or wheel when the wheel is in use.

What I claim is:

1. A resilient filler for cushion tire casings consisting of a body having a central continuous annular supporting portion extending circumferentially of the rim and providing a continuous support between the rim and the tread portion of the tire casing, the inner edge of said body portion being circumferentially grooved or channeled, and the opposite sides of the central portion adjacent the groove being shouldered to engage and retain the clencher portions of the tire casing; said central portion being also provided on its opposite sides with laterally projecting spaced partitions adapted to distend and support the sides of the casing.

2. A filler for cushion tire casings consisting of a body formed of elastic material having a central continuous annular supporting portion extending circumferentially of the rim and providing a continuous support between the rim and the tread portion of the tire casing, said central portion being provided on opposite sides with laterally projecting spaced partitions adapted to distend and support the sides of the casing; the outermost portion of the core being of softer material than the major portion thereof; the inner edge of said body portion being circumferentially grooved or channeled and the sides of the body portion adjacent the groove being shouldered to engage and retain the clencher portions of the tire casing; with a clencher casing adapted to surround the core, substantially as described.

In testimony that I claim the foregoing as my own, I affix my signature.

THEODORE A. SPRAGUE.